United States Patent [19]

Arakawa

[11] 4,278,224

[45] Jul. 14, 1981

[54] WEDGING ACTION FIXTURE

[75] Inventor: Hideo Arakawa, Tokyo, Japan

[73] Assignee: Arakawa, Co. Ltd., Japan

[21] Appl. No.: 918,949

[22] Filed: Jun. 26, 1978

[30] Foreign Application Priority Data

| Jun. 30, 1977 [JP] | Japan | 52-78250 |
| Sep. 24, 1977 [JP] | Japan | 52-115007 |
| Dec. 29, 1977 [JP] | Japan | 52-159022 |

[51] Int. Cl.$^3$ ............................................. A47G 29/02
[52] U.S. Cl. .................................. 248/246; 248/297.2
[58] Field of Search ................ 248/225.4, 246, 295 R, 248/412, 218.4, 295 A

[56] References Cited

U.S. PATENT DOCUMENTS

| 809,448 | 1/1906 | Kahn | 248/246 |
| 1,031,637 | 7/1912 | Fischer | 248/412 X |
| 2,010,292 | 8/1935 | Campbell | 248/412 |
| 2,677,521 | 5/1954 | Willingham | 248/225.4 X |
| 3,016,225 | 1/1962 | Hughes et al. | 248/225.4 X |
| 3,228,647 | 1/1966 | Musianowycz | 248/412 |
| 3,467,352 | 9/1969 | Bohler | 248/246 X |

FOREIGN PATENT DOCUMENTS

| 582090 | 8/1933 | Fed. Rep. of Germany | 248/246 |
| 749531 | 7/1933 | France | 248/246 |
| 216890 | 1/1942 | Switzerland | 248/246 |

Primary Examiner—William H. Schultz
Attorney, Agent, or Firm—Steinberg & Raskin

[57] ABSTRACT

The wedging action fixture to which the invention relates has a wedging action means, a pair of pressing members, wedging action releasing means and other members for limiting the relative movement and transmitting forces between these parts. This fixture can be secured to any desired portion of an elongated supporting member by a wedging action performed by the wedging action means. The external force to be borne is applied to the wedging action means so as to obtain a wedging force which is transmitted to a pair of pressing members. The pressing members acts on both surface of the elongated supporting member so as to cramp the latter therebetween or, alternatively, on both opposing walls of a channeled supporting member to urge the walls away from each other, thereby to bear the external force at any desired position on the elongated supporting member. The fixture can easily be unfastened simply by operating the wedging action releasing means, so that it can be easily moved to any desired position on the elongated supporting member or detached from the latter.

8 Claims, 53 Drawing Figures

WEDGING ACTION FIXTURE

BACKGROUND OF THE INVENTION

The present invention relates to a fixture adapted for supporting an object to any desired portion of an elongated support member, resisting to the force of gravity or other kinds of force exerted on the object.

More particularly, the invention is concerned with a fixture adapted to be attached, for example, to a supporting columns of a rack and to hold the shelf plate of the rack at any desired height, or to the frames of a sash window to hold the window at any desired height.

DESCRIPTION OF THE PRIOR ART

One of the most commonly used fixtures for the described purpose, e.g. for holding the shelf plate of a rack, incorporates a pair of supporting columns in each of which formed are a plurality of holes at a constant pitch, while the shelf plate has at its each side a console the base portion of which is adapted to engage the opposing holes of the supporting columns so that the shelf plate may be stably held by the supporting columns. Alternatively, in the most simple form, the shelf plate is directly engaged by at its both ends by the opposing holes of the two supporting columns, so as to be held by the supporting columns.

This type of fixture, however, poses a problem that it does not allow the continuous change of the height of the shelf plate, due to the discontinuous nature of the holes. Namely, it is not capable of holding the shelf plate at a height or position between the adjacent holes. In addition, the changing of the height of the shelf plate is possible only through troublesome work.

Referring now to the so-called sash window in which the window body is moved up and down along both guide frames, the guide frames are provided with a plurality of holes spaced in vertical direction adapted to receive pins which are mounted horizontally retractably on both sides of the window body. Thus, the window body can be held at one of the levels or opening degrees which are defined by the positions of the holes in the guide frames. According to this arrangement, the window body can be held only at definite heights, because the adjacent holes in one guide frame are spaced by a considerable distance. Namely, it is not possible to select the position of the window freely. In addition, it is often experienced that the holes become clogged with dust or other foreign matters, so as to hinder the safe engagement of the pins with the holes.

SUMMARY OF THE INVENTION

It is therefore a major object of the invention to provide a fixture adapted to be fixed to any desired portion of an elongated supporting member, and capable of bearing an external force at any desired position on the elongated supporting member, without necessitating any recesses or holes in the latter.

It is another object of the invention to provide a fixture capable of bearing an external force at any desired position on an elongated supporting member, by an automatic tightening effect afforded by a wedging action which is caused by the external force.

It is still another object of the invention to provide a fixture which can easily be attached and detached to and from the elongated supporting member, so as to facilitate the change of the position on the elongated supporting member at which the fixture is fixed.

It is a further object of the invention to provide a fixture which would afford quite a simple and small-sized construction of the elongated supporting member to which the fixture is fixed.

It is a still further object of the invention to provide a fixture adapted to be fixed to each of a plurality of elongated supporting members extending in vertical direction in parallel with each other, so as to hold a shelf plate carrying goods at any desired height, and capable of freely and continuously changing the height or level at which said shelf plate is held as required.

It is a still further object of the invention to provide a fixture adapted to be fixed to the window frame of a sash window, and capable of holding the window body at any desired position or height on the window frames and, at the same time, affording a free and continuous change of the position or height at which the window body is held.

According to the present invention, therefore, we provide an apparatus capable of being fixed by wedging action to an elongated support member at a desired position thereof and for supporting at said fixed position an external force in an orientation being orientated along a longitudinal direction of said elongated support member, which apparatus comprises external force receiving means for receiving said external force;

wedging action means adapted to receive said external force transmitted through said external force receiving means and for effecting by said external force a wedging action, said wedging action means including wedging action member for causing a pair of wedging forces substantially in a rectangular direction to said longitudinal direction of said elongated support member and wedging force receiving member having wedging force receiving surface for receiving said pair of wedging forces from said wedging action member;

biasing means adapted to engage said wedging action means and for exerting a biasing force thereon to normally keep said wedging action member in contact with said wedging force receiving surface of said wedging force receiving member;

holding means for holding said elongated support member to be held thereby, said holding means including a pair of first and second pressing members adapted to receive said pair of wedging forces and for exerting on said elongated support member a pair of pressing forces having the same directions and opposite orientations with each other;

wedging force transmitting means adapted to receive said pair of wedging forces and for transmitting the same to said holding means; and wedging action releasing means adapted to receive an external releasing force and for effecting a release of said wedging action of said wedging action means.

Still other objects and advantages of the invention will in part be obvious an will in part be apparent from the specification.

The invention accordingly comprises an article of manufacture possessing the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Before turning to the description of the preferred embodiment, terms as used in this specification will be defined as follows.

Direction: This term has the same sense as the "direction" of force vector as generally used in dynamics, and means degree of inclination in relation with space.

Orientation: This term is used in the same sense as the "orientation" of force vector as generally used in dynamics, and means the destination of a straight line.

Z-direction: This means a direction which is in parallel with the longitudinal direction of a supporting rail member.

X-direction: This means the direction of a pair of forces exerted by holding means on the elongated support member.

Y-direction: This means the direction which makes a right angle to the X-direction and 60° to a right angle to the Z-direction.

X-axis: axis extending in the X-direction
Y-axis: axis extending in the Y-direction
Z-axis: axis extending in the Z-direction
Wedging action member: This means one of the two members which are in contact with each other and make a wedging action in cooperation with each other, which is closer to the external force.
Wedging force receiving member: This means the other of the two members which make the wedging action, i.e. the member remoter from the external force.
Rolling member: This term is used to mean a member which has a surface generated as the locus of a curve when the curve is rotated around a straight line.

Figure 1:
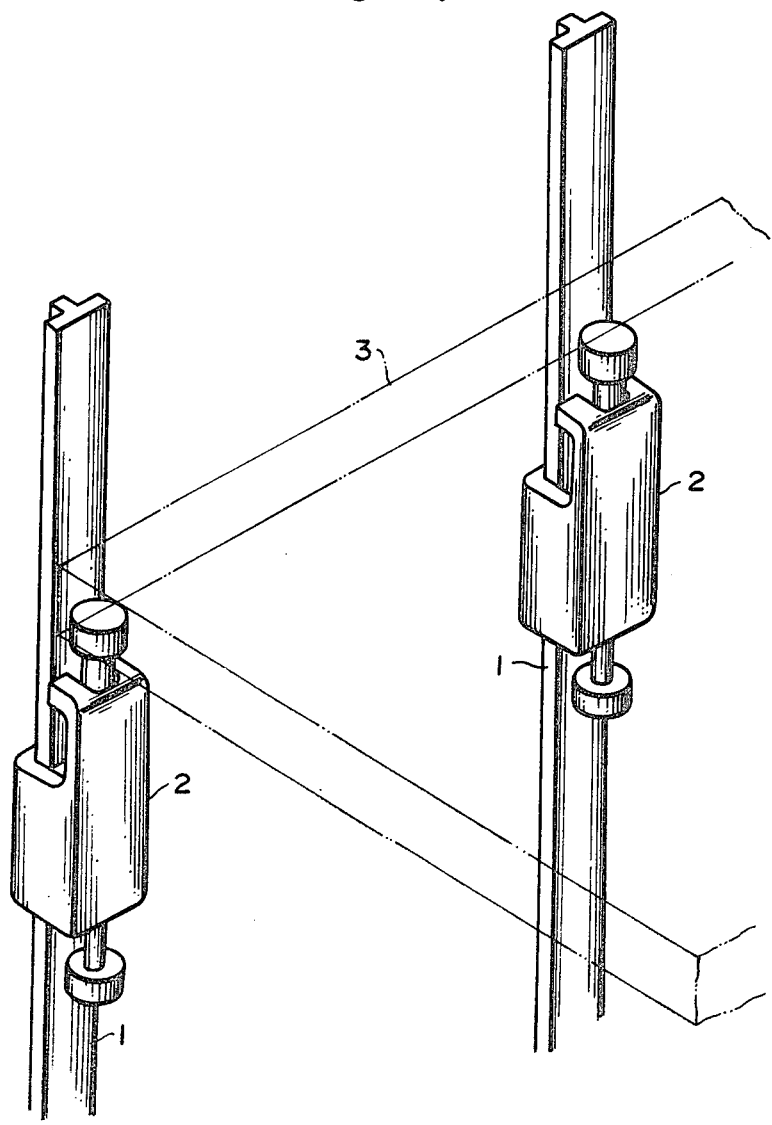
FIG. 1 is a perspective view, showing two fixtures being fixed to two elongated support members.
Figure 2:
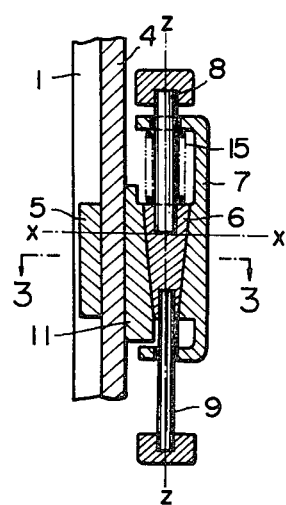
FIG. 2 is a vertical sectional view of an embodiment of a fixture in accordance with the present invention.

Referring first to FIG. 1 showing an embodiment of the invention used specifically for supporting a shelf plate 3, a pair of fixtures 2 of the invention is shown fixed to the predetermined position or height on a pair of supporting posts 1 as elongated support members. To explain in more detail, each of the fixtures 2 is provided with a wedge body 6 as the wedging action means sandwiched between a shoe 11 and a casing 7. Another shoe 5 opposing to the shoe 11 is provided at the laterally extended end of the casing 7 as shown in FIG. 1 and FIG. 2. More specifically, this shoe 5 consists of two halves each of which is attached to each of the laterally extending web parts of the casing 7. The wedge body 6 carries a supporting rod 8 which is provided at its upper end with a cap. A push rod 9 extended downwardly from the lower end of the wedge body 6 is provided at its bottom with a cap. Between the upper end of the wedge body 6 and a part of the casing 7, provided is a spring 15 which is adapted to exert a force on the wedge body which acts normally to bias the latter in the orientation to cause a wedging action. The supporting post 1 has a T-shaped cross-section with a flange 4.

Hereinafter, each part of this embodiment will be described in relation with its function.

The external force, which is in this case the force of gravity caused by the weight of the shelf plate 3 and the goods carried by the latter, is adapted to be received by an external force receiving means constituted by the supporting rod 8 and the cap mounted on the latter. A wedging action member is constituted by the wedging body 6, while a wedging force receiving member is constituted by the shoe 11 and the casing 7, the inner surface of which are tapered to form wedging force receiving surfaces. The spring 15 constitutes a biasing means. The shoe 11 as a first pressing member and the shoe 5 as a second pressing member in combination form a holding means. The function of a wedging power transmitting means for the first pressing member is performed by the shoe 11 itself. That is, the shoe 11 is a unitary body which plays the roles of the wedging force receiving member, wedging force transmitting means and the first pressing member. Meanwhile, a wedging force transmitting means for the shoe 5, which is the second pressing member, is constituted by the portion of the casing 7 extending from the area near the tapered surface of the casing 7 to the shoe 5. Finally, a wedging action releasing means is constituted by the push rod 9 and the cap secured to the lower end of the latter.

In operation, as the fixture 2 is situated as shown in FIG. 2, the wedging body 6 is pressed by the spring 15 to cause a wedging force. The resulting wedging force is transmitted through the wedging force receiving member and the wedging force transmitting means, so as to make the shoes 11 and 5 exert a pair of pressing forces acting in the same direction but in opposite orientations on the flange 4 of the supporting post 1, so as to firmly grip or clamp the supporting post 1. Consequently, the fixture 2 can be retained at the desired height on the supporting post 1, even when it is released from the operator's hand.

As the weight of the shelf plate 3 and the goods carried by the latter is applied to the upper end of the supporting rod 8, the resulting force is exerted in the direction for enhancing the wedging action, along the Z-axis and transmitted to the wedge body 6 through the supporting rod 8, so as to impart a wedging force to both of the shoe 11 and the casing 7, so that the shoes 11 and 5 grip the flange 4 more strongly, thereby to hold the fixture 2 at the desired height on the supporting post 1. In this connection, it is to be noted that the fixture is held unmoved even when a large weight is applied thereto, because of the fact that the larger the weight becomes, the larger the wedging force grows, so as to grip and clamp the supporting post with a correspondingly increased force.

For changing the position or height of the shelf plate 3, the shelf plate is demounted and the upper edge of the casing 7 and the cap of the push rod 9 are pressed toward each other by fingers, along the Z-axis. Consequently, the wedge body 6 is moved upward, overcoming the force of the spring 15, so as to dismiss the wedging action, and the flange 4 of the supporting post is released from the shoes 11,5, allowing a free movement of the fixture 2 up and down along the supporting post 1. Then, after shifting the position of the fixture 2 to the new height, the latter comes to be fixed to the supporting post 1 again, as the wedging action releasing means is freed.

It will be seen from the foregoing description that, according to this embodiment, the shelf plate can be freely and continuously shifted to any desired height. At the same time, a heavy load can be stably and rigidly supported. Further, the fixture of this embodiment have various advantages such as simple construction, reduced number of parts, outstanding reliability, easy handling afforded by reduced weight and small size and lowered cost of cost of manufacture, i.e. a low price.

Figure 4:
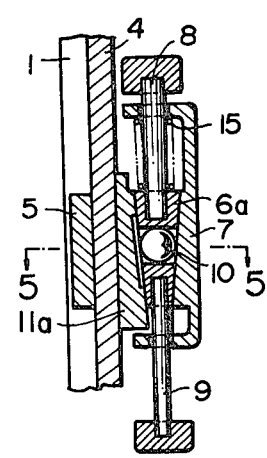
FIG. 4 is a vertical sectional view of another embodiment of a fixture in accordance with the present invention.
Figure 3:
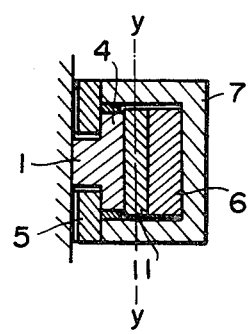
FIG. 3 is a transverse sectional view taken along the line 3—3 of FIG. 2.
Figure 5:
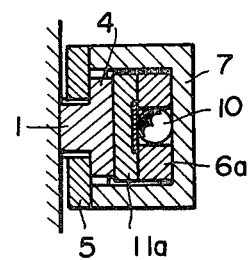
FIG. 5 is a transverse sectional view taken along the line 5—5 of FIG. 4.
Figure 6:
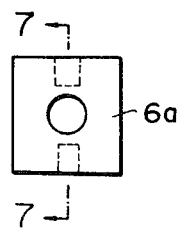
FIG. 6 is an elevational view of a wedge member in the invention.
Figure 7:
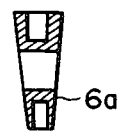
FIG. 7 is a side view of FIG. 6.
Figure 8:
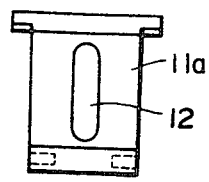
FIG. 8 is an elevational view of a shoe in the invention.
Figure 9:
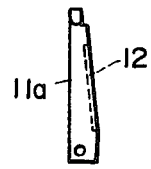
FIG. 9 is a side view of FIG. 8.

FIG. 4 shows another embodiment of the invention. In this embodiment, a ball 10 is used as the wedging action member. In this case, the wedge body 6a functions as a retainer for retaining the ball 10. The thickness of the wedge body 6a is selected such that the ball 10 projects slightly (for example, 0.1 to 0.2 mm) from the surface of the wedge body, so that, even when the ball sinks into the tapered surface due to an excessively heavy load, the surface of the wedge body 6a comes into contact with the tapered surface, so as to prevent the latter from being further deformed. At the same time, troubles attributable to the slight error in the relative inclination of the tapered surfaces or in the flatness of these surfaces are conveniently avoided. Further, the release or dismissal of the wedging action is facilitated thanks to the rolling function of the ball 10.

The details of the constructions of the wedge body 6a and the shoe 11a are shown, respectively, in FIGS. 6, 7 and FIGS. 8, 9. A reference numeral 12 denotes a ball seat made of a hard material such as a high carbon steel embedded in the back metal. A similar ball seat is provided also in the tapered surface of the casing 7. The casing 7 and the shoes 5,11 are made of an aluminum alloy which exhibits a light weight and good anti-rust property.

The ball 10 may be substituted by a cylindrical roller or a spherical roller. At the same time, one of the tapered surfaces of the shoe 11 and one of the tapered surfaces of the casing 7 may extend in parallel with Z-axis.

Figure 10:
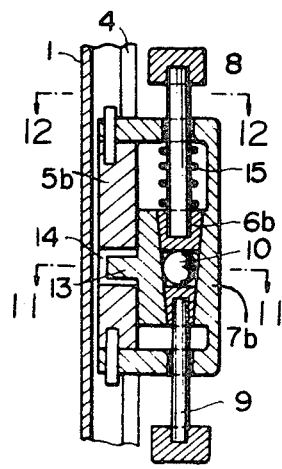
FIG. 10 is a vertical sectional view of still another embodiment of the invention.
Figure 11:
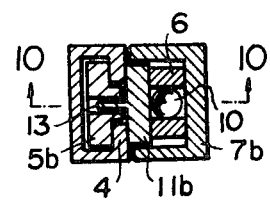
FIG. 11 is a transverse sectional view taken along the line 11—11 of FIG. 10.
Figure 12:
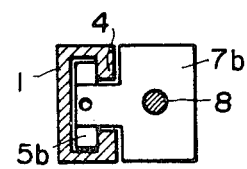
FIG. 12 is a transverse sectional view taken along the line 12—12 of FIG. 10.
Figure 13:
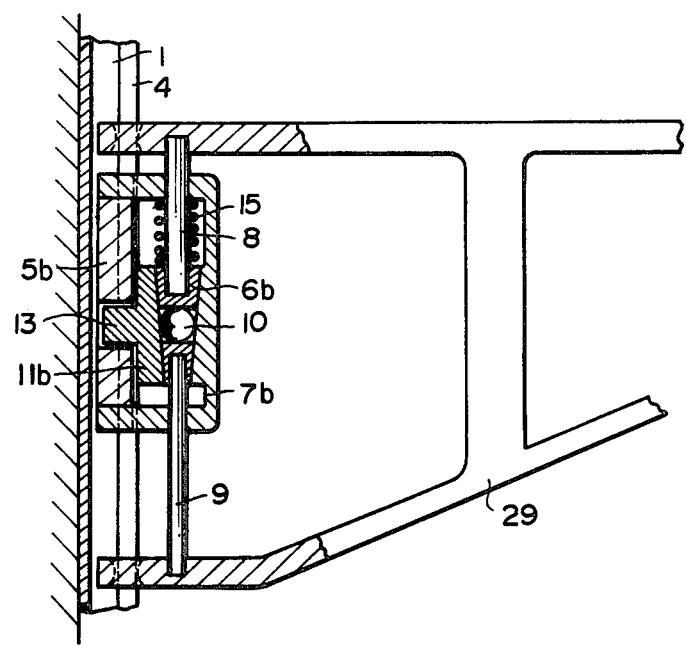
FIG. 13 is a vertical sectional view of an embodiment of a fixture including a console for a shelf.
Figure 14:
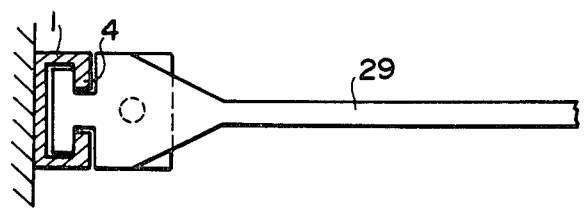
FIG. 14 is a plan view of FIG. 13.

FIGS. 10 to 12 show still another embodiment of the invention which is adapted for use in combination with a C-cross-sectioned supporting post 1. In this embodiment, the shoe 5b is a unitary piece and is secured to the extension of the casing 7b by means of a pin. A projection 13 formed on the shoe 11b is received by a bore 14 formed in the shoe 5b, thereby to prevent the shoe 11b and the casing 7 from moving relatively to each other in Z-direction. This arrangement presents a more compact construction of the fixture, as compared with the fixture used for the T-cross-sectioned supporting post. FIGS. 13 and 14 show an example of this embodiment adapted for carrying a console 29 of a shelf. In this case, the supporting rod 8 and the push rod 9 of the fixture are unitarily held between the upper and lower parts of the console. It will be understood by those skilled in the art that the console 29 can be lifted up freely by hand, but the fixture strongly holds the console 29 against downward movement as a downward load is applied to the console 29. At the same time, the fixture frees the supporting post 1 to allow the console to freely move up and down along the supporting post, as the clamping action is dismissed by urging the upper end of the casing 7b and the lower part of the console 29 toward each other by fingers.

Figure 15:
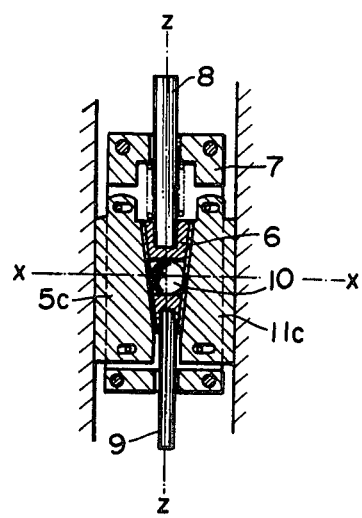
FIG. 15 is a vertical sectional view of still another embodiment of a fixture in accordance with the present invention.
Figure 16:
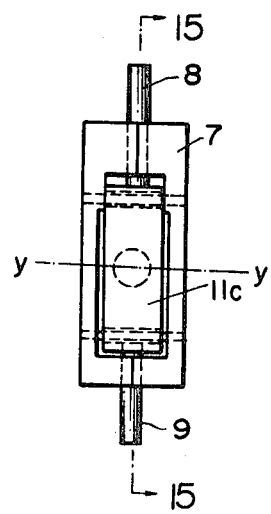
FIG. 16 is a side view of FIG. 15.

FIGS. 15 and 16 show a further embodiment of the invention intended for use in association with a [-cross-sectioned or C-cross-sectioned supporting post. In this embodiment, the fixture is fixed to the supporting post 1 with its shoes 11c,5c pressing opposing walls of the post 1, such that these walls are urged away from each other. Thus, each of the shoes 5c,11c plays the role of the wedging force receiving member, wedging force transmitting means and the holding means. According to this arrangement, the whole part of the fixture 2 is conveniently received by the channel of the supporting post 1.

Figure 17:
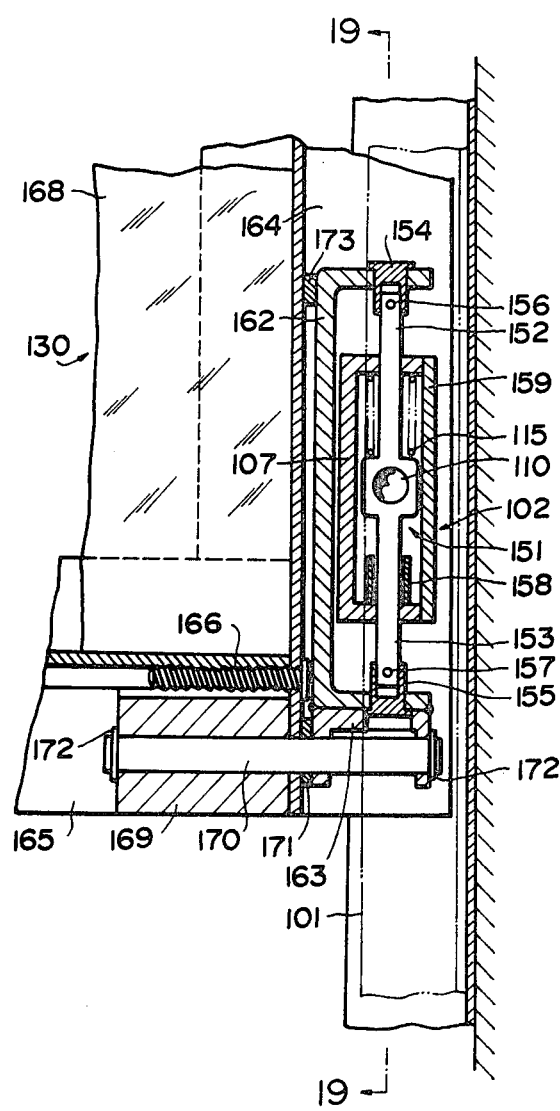
FIG 17 is a vertical sectional view of an embodiment taken along the line 17—17 of FIG. 19, showing a fixture applied to a window sash.
Figure 18:
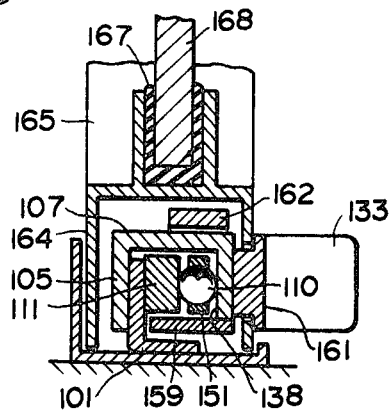
FIG. 18 is a transverse sectional view taken along the line 18—18 of FIG. 19.
Figure 19:
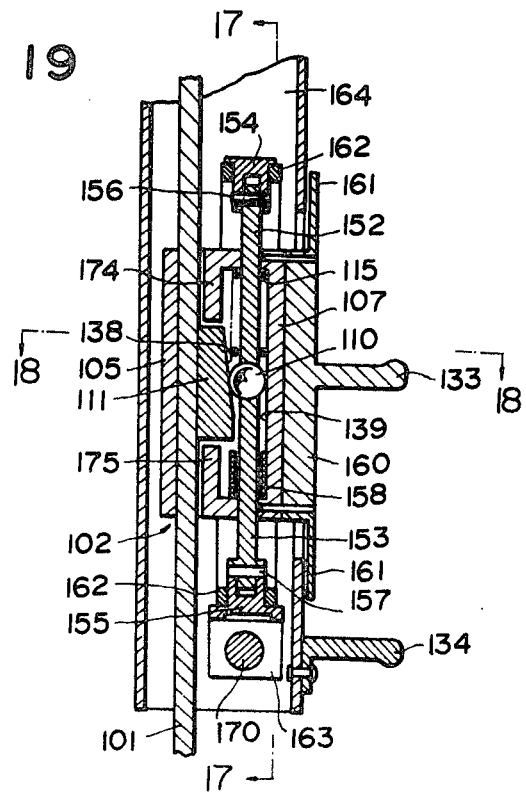
FIG. 19 is a vertical sectional view taken along the line 19—19 of FIG. 17.
Figure 30:
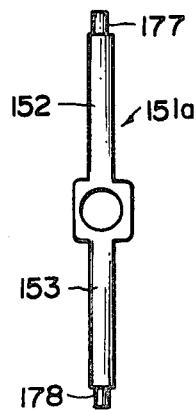
FIG. 30 is an elevational view of a spindle incorporated in an embodiment of the present invention.
Figure 31:
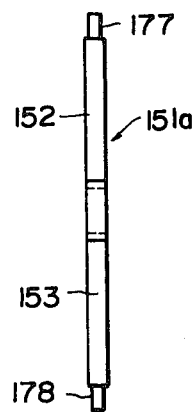
FIG. 31 is a side view of FIG. 30.

Referring now to FIGS. 17, 18 and 19, there is shown a still further embodiment of the invention applied to a sash window. An L-cross-sectioned elongated supporting member 101 is attached to each side frame of the window structure. A shoe 105 is formed unitarily with a casing 107 having a wedging action surface 139 extending in parallel with Z-axis. A shoe 111 has a sliding surface, while the opposite surface thereof constitutes a tapered wedging action surface 138. A ball 110 is retained by a spindle 151 which acts as a retainer. This spindle 151 is similar to that as shown in FIGS. 30 and 31, and is provided at almost its center with a bore for receiving and holding the ball 110 and rods 152 and 153 rigidly extending from both sides of the bore. The rod 152 is fixed at its upper end to a sleeve 154 through a pin 156, while the rod 153 is secured at its lower end to a sleeve 155 through a pin 157. The spindle 151 has a plate-like shape of a uniform thickness and, therefore, can be made out of a thin web material by, for example, punching. Reference numerals 158 denotes a stopper for limiting the stroke of the spindle 151, while a cover attached to the casing 107 is denoted by a reference numeral 159. A knob seat attached to the casing 107 has a knob 131 and both end flanges 161. Reference numerals 174 and 175 denote stoppers adapted to limit the movement of the shoe 111.

Sleeves 154 and 155 are supported by a bracket 162 for free rotation around Z-axis. The lower end of the bracket 162 has a fixing member 163 unitary therewith.

Turning now to the window body, longitudinal and transverse window frames 164,165 are secured to each other by means of bolts 166, and cooperate with each other in holding a glass 168 through a medium of a packing 167. A supporting block 169 is attached by means of a bolt 176 to the lower end of the longitudinal window frame 164 received by the transverse window frame 165. The supporting block 169 holds a pin 170.

The aforementioned fixing member 163 is attached rotatably to the pin 170, with a washer interposed therebetween. Reference numerals 172 and 173 denote, respectively, a snap ring for preventing the pin from dropping out and a washer. The positions of the longitudinal window frame 164 and the fixture 102 relative to each other can be optionally changed by changing the thicknesses of these washers 171 and 173. The pin 170 has its axis aligned with Y-axis, so that the fixture 102 as a whole can be rotated around Y-axis.

The above stated construction of this embodiment is prepared for absorbing all processing and assembling errors of the window frames and the elongated supporting member, in all of X,Y and X directions and around X,Y and Z axes. Consequently, the tolerance of the error in production and assembling of the elongated supporting member 101 and the window itself can be made large, affording an easy and simple production and assembling of every parts of the window structure, as well as good replaceability of the parts. In addition, the fixture can easily be attached to the window frame. In fact, it can be attached even after the installation of the window body on the frames on the wall.

Further, in this embodiment, the spindle 151 has such a simple shape as can be easily obtained at low cost by, for example, punching from a web material. This is quite effective in diminishing the weight of the fixture and reducing the production cost of the same.

Figure 22:
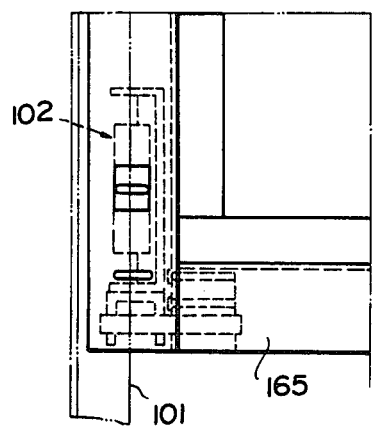
FIGS. 22 and 23 are sectional elevational views of a lower part of a window sash to be equipped with a fixture according to the present invention.
Figure 23:
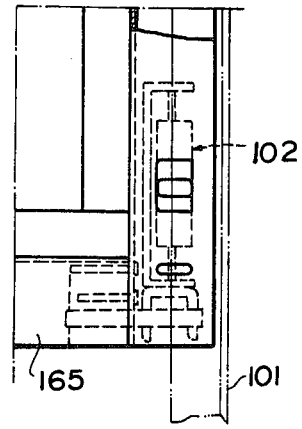

FIGS. 22 and 23 show a modification in which the knob seat 160 is omitted but, rather, the knob 133 is directly attached to the casing 107, while the longitudinal window frame 164 is provided with a through bore for movably receiving the knob 133. This modification can perform the fixing function sufficiently well, but the embodiment as shown in FIGS. 18 to 20 having the flanges 161, because these flanges conveniently covers the bore to provide a better appearance and to prevent dusts or other foreign matters from coming into the bore.

FIGS. 30 and 31 show another form of the spindle 151a. This spindle 151 has columnar pivots 177,178 provided at outer ends of the rods 152,153, by means of which the spindle 151a is rotatably secured directly to the bracket 162, without being assisted by the sleeves 154,155.

Figure 20:
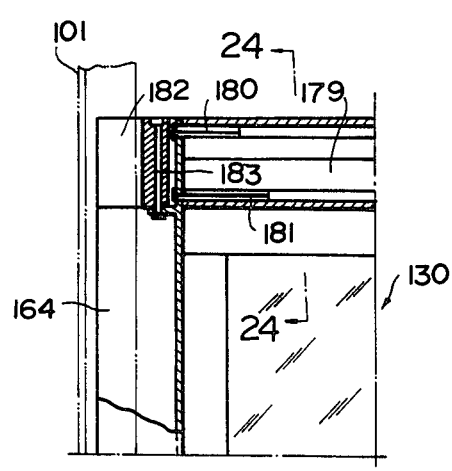
FIGS. 20 and 21 are sectional elevational views of an upper part of a window sash to be equipped with a fixture according to the present invention.
Figure 24:
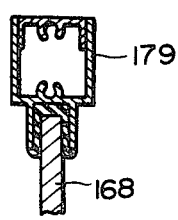
FIG. 24 is a transverse sectional view taken along the line 24—24 of FIG. 20.

FIGS. 20, 22 and 24 show examples of window structure incorporating the fixture 102 as shown in FIGS. 17 to 19 in the same manner as described. The upper transverse window frame 179 is attached to the longitudinal window frame 164 by means of bolts 180,181. At the same time, a guide block 182 is secured to the upper end of the longitudinal window frame 164, by means of a bolt 183. The guide block 182 has a groove adapted for receiving the elongated supporting member 101, so as to guide the window body 130 along the latter.

Figure 21:
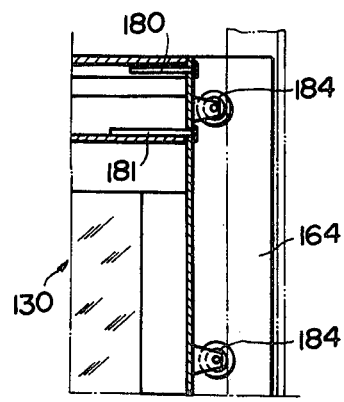
Figure 25:
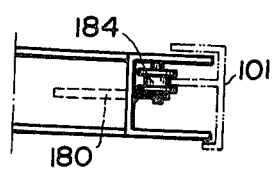
FIG. 25 is a plan view of FIG. 21.

FIGS. 21, 23 and 25 show another example of the window structure in which the window body 130 is adapted to be guided by a roller 184 secured to the longitudinal window frame 164.

Figure 26:
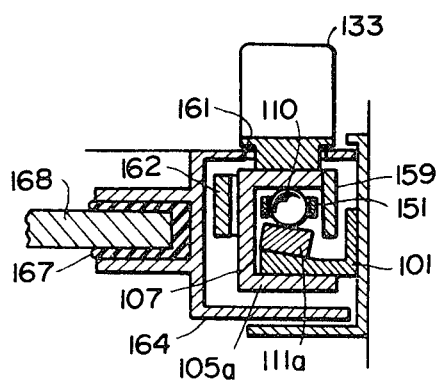
FIG. 26 is a transverse sectional view of still another embodiment of a fixture of the present invention.

FIG. 26 shows a still further embodiment of the invention in which the sliding surface of the shoe 111*a* is inclined to that of the shoe 105*a*. Thus, this embodiment is intended for use in combination with an elongated supporting member 101 having a tapered surface. Slight gaps in Y and Z directions are preserved around the shoe 111*a*. At the same time, the shoe 111 is carried by a ball 110. The sliding surface of the shoe 111*a* is therefore allowed to incline with respect to the sliding surface of the shoe 105*a*, within a given range of inclination angle. Thus, the fixture can follow a slight inclination of the elongated supporting member 101, even when the latter is installed at a slight inclination to the vertical line. In other words, the fixture 102 can absorb the rotational deviation of the window structure around X-axis attributable to the assembling error and so forth.

As the rotational deviation around X-axis grows beyond a predetermined angle, the fixture can no more follow the deviation. In such a case, the sliding surface of the shoe 111*a* comes to make a local contact with the inclined surface of the elongated supporting member 101. This local contact, however, produces a force which acts to diminish or correct the rotational deviation around X-axis. This function of the inclined surface of the elongated supporting member offers the following advantage.

Supposing that each of the pair of vertical elongated supporting member, which is provided at each side of the window body 130 for guiding and holding the latter, is provided with an inclined surface as illustrated, a force which tends to correct the posture of the window body 130 to the horizontal posture is always generated to prevent the window body 130 from skewing on the elongated supporting members, even when the window body 130 is moved up and down by a force which is applied in such a manner as to cause an inclination of the window to the horizontal line, thereby to ensure a smoother movement of the window body 130. The slope or gradient of the inclination of the inclined surface of elongated supporting member is preferably 1/15 to ⅓, and 2/15 to ¼ more preferably.

As an alternative measure, the shoe 111*a* itself may be formed to have a trapezoidal cross-section, with its tapered surface abutting the inclined surface of the elongated supporting member.

Further, the inclined surface of the elongated supporting member 101 may be provided at opposite side of the latter to the illustrated side. In such a case, the shoe 105*a* holds a triangular-cross-sectioned or trapezoidal cross-sectioned taper shoe adapted to contact the inclined surface of the elongated supporting member. Needless to say, the same advantageous effect can be obtained by making the elongated supporting member have inclined surfaces at its both sides.

Figure 27:
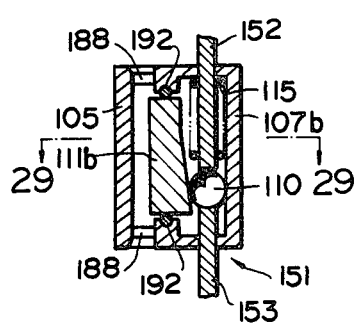
FIG. 27 is a vertical sectional view of still another embodiment of a fixture of the present invention.
Figure 28:
FIG. 28 is an enlarged sectional view of a guide member incorporated in an embodiment of the present invention.
Figure 29:
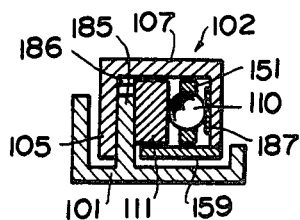
FIG. 29 is a transverse sectional view taken along the line 29—29 of FIG. 27.

Referring now to FIG. 27 showing a still further embodiment of the invention, the position of the ball is shifted downward, in order to reduce the length of the casing 107*b*. Since the casing 107*b* itself has a symmetric form with respect to its horizontal axis line, this casing can be used commonly for the fixtures having different orientations of the action. The upper and lower inner surfaces of the casing 107*b* opposing to the respective ends of the shoe 111*b* are provided with grooves receiving pins 192 of a plastic or a metal intended for use as low friction guides. The groove for receiving and holding the pin 192 may hold the latter over a half or, as shown in FIG. 28, more than a half thereof. Alternatively, the groove can have a rectangular form. Anyway, it is preferred that the groove holds the pin 192 rotatably.

Figure 32:
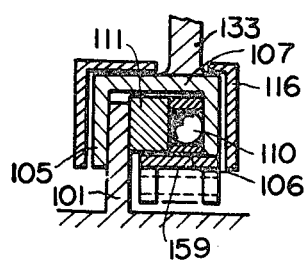
FIG. 32 is a transverse sectional view taken along the line 32—32 of FIG. 33.
Figure 33:
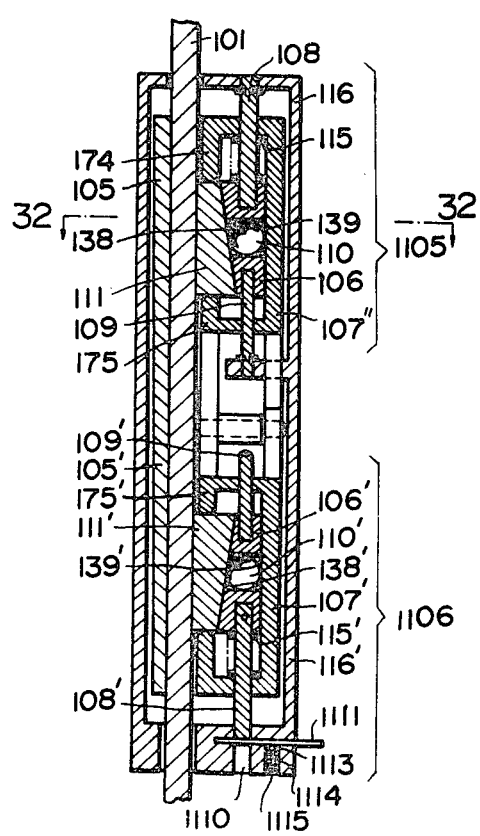
FIG. 33 is a vertical sectional view taken along the line 33—33 of FIG. 34, showing still another embodiment of the present invention.
Figure 34:
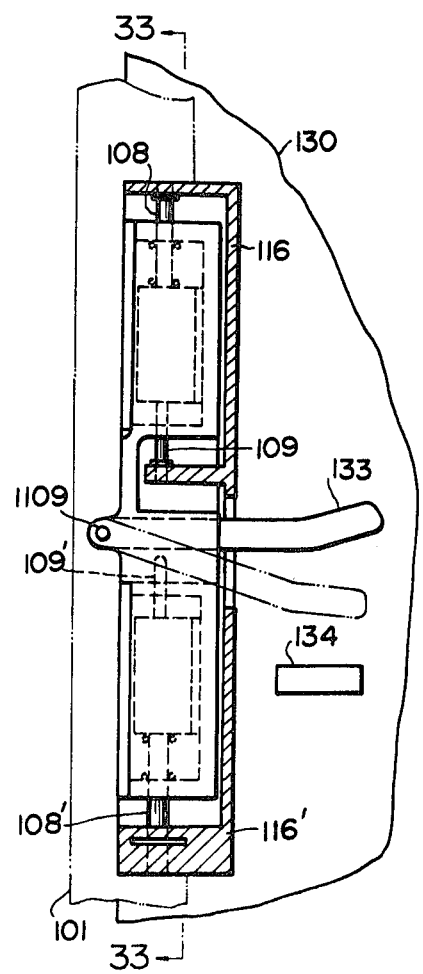
FIG. 34 is a vertical sectional side view of FIG. 33.

FIGS. 32 to 34 show a still further embodiment of the invention which is additionally provided with a locking function against the upward movement.

In use, a lock lever 1111 is rotated to clear a lock guide bore 1110, so as to allow a supporting rod 108' to slide. Then, the knob 133 is pressed and moved toward the knob 134 by fingers. Consequently, a push rod 109' of a second fixture 1106 is depressed to cause a movement of a ball 110', so as to release the elongated supporting member from the clamping action of the second fixture 1106. As the knob 133 is further depressed downward to come into contact with a shoulder portion of the casing 107', the casing 107' and, accordingly, the casing 107" unitary with the latter are moved downward relatively to covers 116,116'. This movement is accompanied by a downward movement of the wedging action surfaces 138,139 relative to the ball 110 which is carried by the push rod 109, so that the cramping action of the first fixture is also dismissed. Thus, the elongated supporting member is kept free from the cramping force of the first and the second fixtures, as long as the knobs 133,134 are held together. It is therefore possible to freely lift and lower the window body 130 by hands gripping the knobs 133,134 at respective sides of the window body 130.

After moving the window body 130 to the desired height, the wedging action of the first fixture is turned into effect by the force of the spring 115 and weight of the window body 130, as the knobs 133,134 are released. Then, the knob 133 is moved automatically upwardly by the force of the spring 115' of the second fixture so as the make the latter operative. Then, the lock lever 1111 is returned to the original position to lock the second fixture against the upward movement.

It is to be noted here that the dismissal of the wedging action of the second fixture 1106 has to be made strictly in advance to the dismissal of that of the first fixture 1105, for otherwise the smooth movement of the window body is failed.

For this reason, it is preferred to preserve a quantitative difference between the wedging actions of of both fixtures, if the sizes, shapes, friction coefficients, hardnesses and other physical conditions of the members consistuting the wedge bodies and shoes of the first and second fixtures are identical, although the earlier dismissal of the wedging action of the second fixture 1106 is ensured by the fact that the force applied to the push rod 109' is always greater than the reactional force exerted on the pin 1109 and that the wedging action in the first fixture 1105 is always stronger than that in the second fixture 1106 due to the presence of the weight of the window body 130.

The above stated quantitative difference can be realized by, for example, making the gradient of the wedging action surfaces 138',139' of the second fixture 1106 slightly larger than that of the first fixture 1105, or selecting the spring constant of the spring 115' smaller than that of the spring 115.

Figure 35:
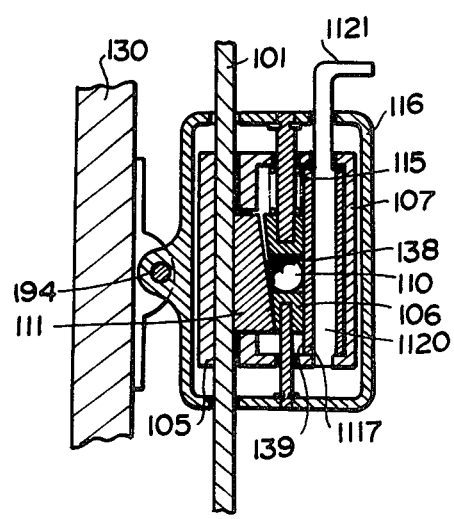
FIG. 35 is a vertical sectional view of still another embodiment of a fixture of the present invention.
Figure 36:
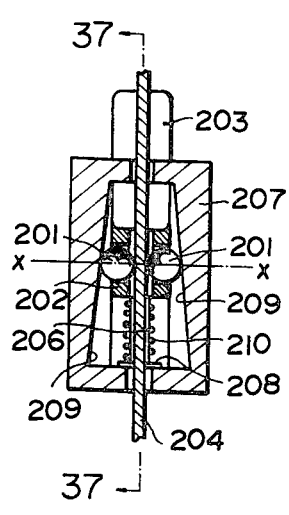
FIG. 36 is a vertical sectional view of still another embodiment of a fixture of the present invention.
Figure 37:
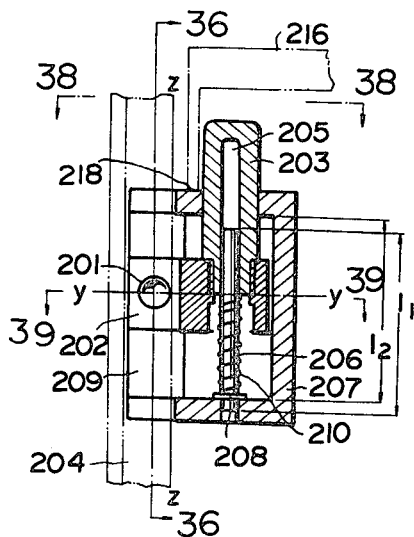
FIG. 37 is a vertical sectional view taken along the line 37—37 of FIG. 36.
Figure 38:
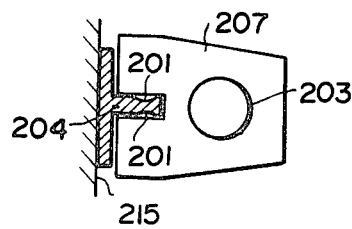
FIG. 38 is a transverse sectional view taken along the line 38—38 of FIG. 37.

FIG. 35 shows a still further embodiment provided with locking facility. In this embodiment, a block 1117 is carried by an eccentric pin 1120 having an axis of rotation extending in Z direction. The locking action is caused by rotating the eccentric pin 1120 through a handle 1121. According to this arrangement, the operation of the block 1117 is never hindered, even when there is a slight movement of the block 1117 and the ball 110 in Z direction relatively to each other, so that the safe functioning of the fixture is ensured and the tolerance of the production and assembling errors is made larger, offering an easier production and assembling.

FIGS. 36 to 39 show s still further embodiment of the invention in which a pair of balls 201 directly clamps the elongated supporting member 204 therebetween. In this embodiment, the external force receiving means is constituted by the upper surface of the casing 207, while the wedging action member is formed by the casing 207. Meanwhile, the balls 201 play the roles of the wedging force receiving member, wedging force transmitting means and the holding means. The biasing means and the wedging action releasing means are constituted, respectively, by a spring 210 and a push pin 203. The surfaces of the ball 201 function as the wedging action receiving surfaces. A retainer, guide bore, guide pin, snap ring, tapered surface and a shelf plate are designated at reference numerals 202,205,206, 208,209 and 216, respectively.

Figure 40:
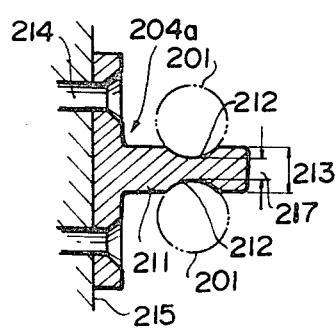
FIG. 40 is an enlarged transverse sectional view of an elongated support member to be held by a fixture of the present invention.
Figure 39:
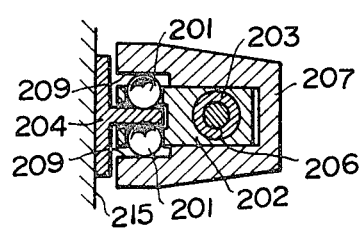
FIG. 39 is a transverse sectional view taken along the line 39—39 of FIG. 38.

FIG. 40 show another form of the elongated supporting member, designated 204a in which the flange 211 adapted to be clamped by the balls 201 is grooved at its both faces, as at 212. The setting of the fixture on the elongated supporting member 204a can be made at any desired position on the latter, by selecting the thickness 213 of the flange 211 smaller than the maximum clearance between two balls 201. A reference numeral 215 denotes a post to which the elongated supporting post 204a is secured by means of bolts 214.

Figure 41:
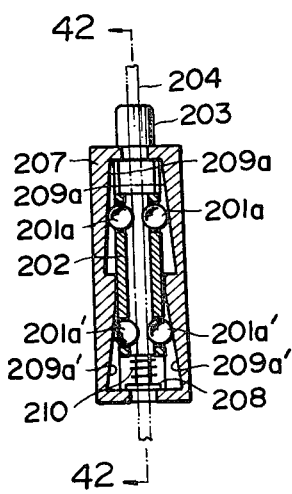
FIG. 41 is a vertical sectional view taken along the line 41—41 of FIG. 42, showing still another embodiment of a fixture.
Figure 42:
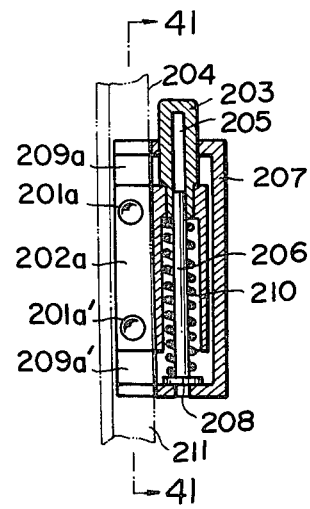
FIG. 42 is a vertical sectional view taken along the line 42—42 of FIG. 41.

FIGS. 41 and 42 show a still further embodiment of the invention having two pairs 201a, 201a' of balls and two pairs 209a, 209a' of tapered surfaces. As will be seen clearly from FIG. 41, one ball 201a and one ball 201a' are retained by the same retainer 202a. This arrangement can provide a larger supporting capacity.

Figure 43:
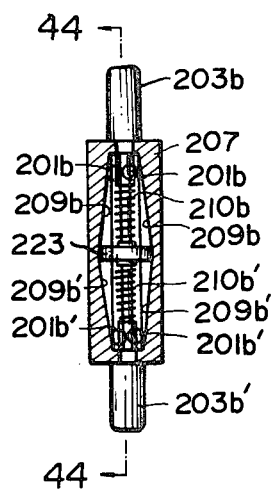
FIG. 43 is a vertical sectional view taken along the line 43—43 of FIG. 44, showing still another embodiment of a fixture.
Figure 44:
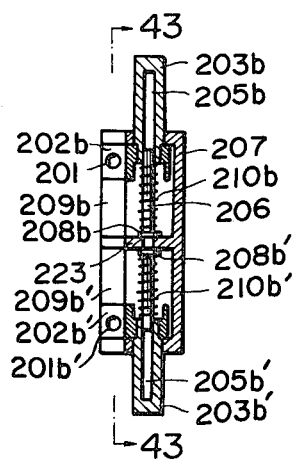
FIG. 44 is a vertical sectional view taken along the line 44—44 of FIG. 43.

Referring now to a still further embodiment of the invention illustrated in FIGS. 43 and 44, two pairs 209b, 209b' of tapered surfaces are arranged in reverse orientations to each other, and the balls 201b, 201b', retainers 202b, 202b', push pins 203b, 203b', guide bores 205b, 205b', snap rings 208b, 208b' and the spring 210b, 210b' are arranged in symmetry, so that the wedging action is performed in either direction.

Figure 45:
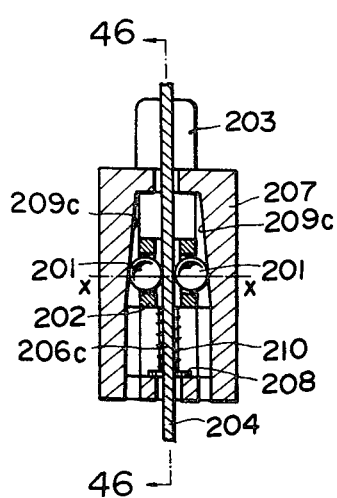
FIG. 45 is a vertical sectional view taken along the line 45—45 of FIG. 46, showing still another embodiment of a fixture.
Figure 46:
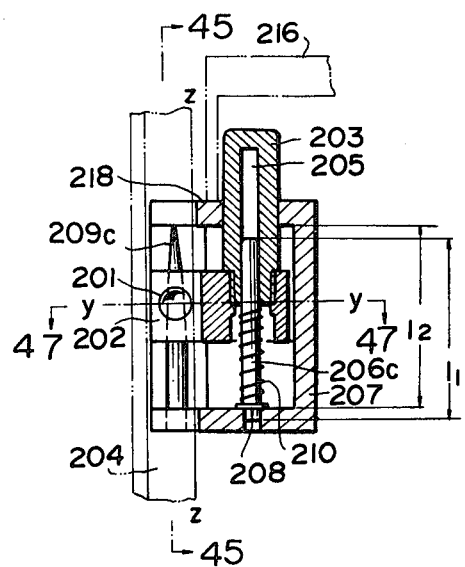
FIG. 46 is a vertical sectional view taken along the line 46—46 of FIG. 45.
Figure 47:
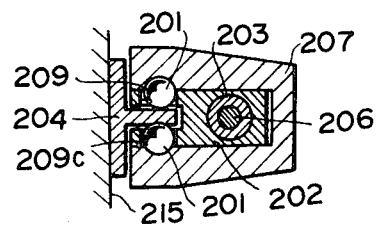
FIG. 47 is a transverse sectional view taken along the line 47—47 of FIG. 46.

Referring to FIGS. 45 to 47 showing a still further embidiment of the invention, each of the tapered surfaces 209c are constituted by a concaved guide surface which is generated by straight lines inclined to Z-axis. Thus, any force acting in Y-direction can be resisted by an engagement of the balls 201 with the concaved guide surface. By applying this concaved guide surface to the embodiment as shown in FIGS. 41 and 42, the moment caused by the misalignment of the line of vertical external force with the center of the balls 201 can be fairly received by the balls 201, 201', so that the guide pin 206c is not subjected to the moment.

In these embodiments according to the FIGS. 36 to 47, referring only to the reference numerals without the letter suffixes designating the particular embodiment, it will be understood that the balls 201, 201' at one side in these figures may be omitted. In this case, the tapered surface 209, 209' at that side from which the balls 201, 201' are omitted are arranged to form a plane parallel to the Z-axis so that the plane makes direct contact with the elongated support member 204. Also in these embodiments, the balls 201, 201' may be replaced with cylindrical rollers, spherical rollers or grooved rollers (for wire rope or cable use). When the balls 201, 201' are replaced with grooved rollers, convexed guide surfaces generated by generating lines inclined with respect to the Z-axis are provided instead of the above described concaved guide surfaces.

Figure 48:
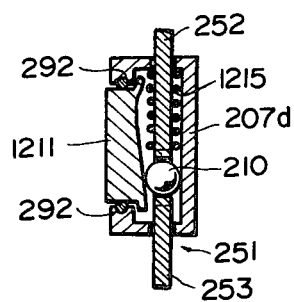
FIG. 48 is a vertical sectional view of still another embodiment of a fixture according to the present invention.
Figure 49:
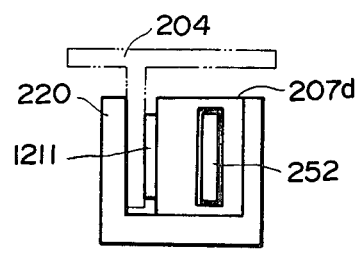
FIG. 49 is a plan view of an embodiment of a fixture according to the present invention.

FIG. 48 shows a still further embodiment in which the outer surface of the casing 207d, in addition to the shoe 1211, is adapted to play the role of the shoe. A spring is designated at a reference numeral 1215. This fixture is used, similarly to that shown in FIG. 15, as an expanding type fixture adapted to urge two opposing flanges of a chenneled elongated supporting member away from each other. At the same time, this fixture can be used as a cramping type fixture, in combination with a [-cross-sectioned member, as shown in FIG. 49, to cramp a T-sectioned elongated supporting member 204. In such a case, the elongated supporting member 204 is cramped by the shoes 220,1211. A spindle, two rods of the spindle and a pin are designated at reference numerals 251, 252,253 and 292, respectively.

Figure 50:
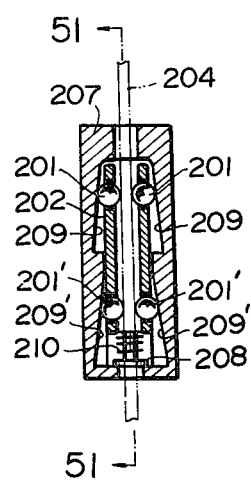
FIG. 50 is a vertical sectional view taken along the line 50—50 of FIG. 51, showing still another embodiment of a fixture.
Figure 51:
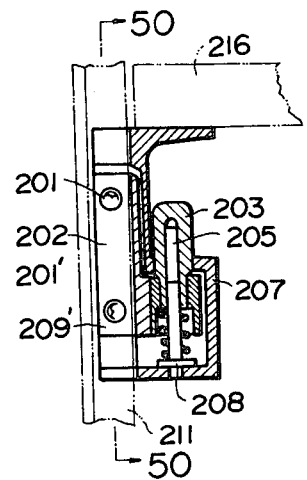
FIG. 51 is a vertical sectional view taken along the line 51—51 of FIG. 50.

FIGS. 50 and 51 show a still further embodiment in which the fixture has a compact construction incorporating a portion for supporting the shelf plate 216. It is understood that the same reference numerals are used in FIGS. 50-53 to designate parts which correspond to the identically designated parts illustrated in the embodiment of FIG. 36.

Figure 52:
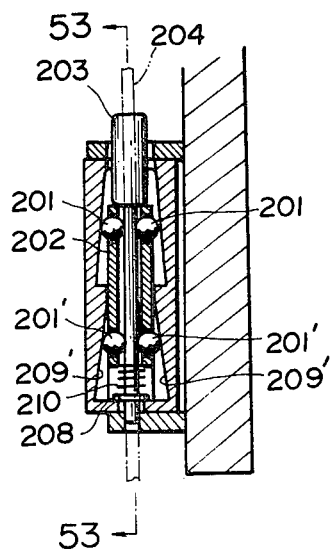
FIG. 52 is a vertical sectional view taken along the line 52—52 of FIG. 53, showing still another embodiment of a fixture.
Figure 53:
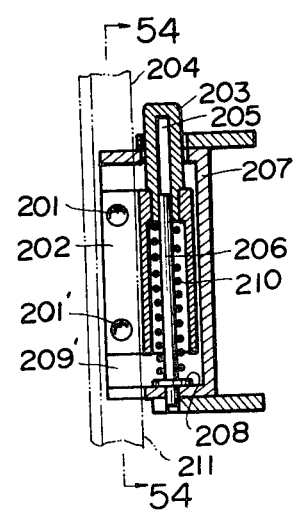
FIG. 53 is a vertical sectional view taken along the line 53—53 of FIG. 52.

Finally, FIGS. 52 and 53 show a still further embodiment of the invention similar to that of FIGS. 41 and 42, but attached to the window in a different manner.

It will be understood by those skilled in the art that the described fixture can be used not only for bearing a load applied in vertical direction but also for supporting an object at any desired position against a horizontal movement, e.g. for supporting a laterally slidable door.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. Apparatus capable of being fixed by wedging action to an elongated support member at a desired position thereof and for receiving and supporting at said fixed position an external force applied in a direction substantially parallel to the longitudinal axis of said elongated support member, said apparatus comprising:
   external force receiving means for receiving said external force;
   wedging action means adapted to receive said external force transmitted through said external force receiving means and for effecting by said external force a wedging action, said wedging action means including a wedging action member for generating a pair of wedging forces substantially in a perpendicular direction to said longitudinal axis of said elongated support member and wedging force receiving member having wedging force receiving surface for receiving said pair of wedging forces from said wedging action member;
   biasing means adapted to engage said wedging action means and for exerting a biasing force thereon to normally keep said wedging action member in contact with said wedging force receiving surface of said wedging force receiving member;

holding means for holding said elongated support member, said holding means including a pair of first and second pressing members, each being adapted to receive a respective one of said pair of wedging forces and for exerting on said elongated support member a pair of pressing forces having the same directions and opposite orientations with respect to each other;

wedging force transmitting means adapted to receive said pair of wedging forces and for transmitting the same to said holding means;

wedging action releasing means adapted to receive an external releasing force and for effecting a release of said wedging action of said wedging action means wherein said wedging action member includes a casing having formed therein at least one pair of interior opposed surfaces which taper towards each other in the longitudinal direction and adapted to make contact with said wedging force receiving member, said casing having a longitudinally extending open side formed between said tapered surfaces receiving therethrough said elongated support member so that a longitudinally extending portion thereof is located between said first and second pressing members.

2. An apparatus as claimed in claim 1, wherein said wedging force receiving member comprises at least one pair of rolling members, each rolling member being retained at a predetermined position by a retainer member slideably disposed in said casing.

3. An apparatus as claimed in claim 2 wherein said rolling member comprises a ball.

4. An apparatus as claimed in claim 2 wherein each of said first and second pressing members of said holding means comprises said rolling member.

5. An apparatus as claimed in claim 2, wherein said rolling members and said tapered surfaces are arranged in two pairs.

6. An apparatus as claimed in claim 1, wherein said external force receiving means comprises a portion of the outer surface of said casing.

7. An apparatus as claimed in claim 2, wherein said biasing means comprises a coil spring disposed between said casing and said retainer member.

8. An apparatus as claimed in claim 2, wherein said wedging action releasing means comprises a guide pin disposed in said casing and a push pin mounted slideably on said guide pin and engaged with said retainer member.

* * * * *